US012688462B2

(12) United States Patent
Goodsitt et al.

(10) Patent No.: US 12,688,462 B2
(45) Date of Patent: Jul. 21, 2026

(54) SYSTEMS AND METHODS FOR GENERATING FEDERATED LEARNING MODELS

(71) Applicant: Capital One Services, LLC, McLean, VA (US)

(72) Inventors: Jeremy Goodsitt, Champaign, IL (US); Michael Davis, Arlington, VA (US); Taylor Turner, Richmond, VA (US); Kenny Bean, Herndon, VA (US); Tyler Farnan, San Diego, CA (US)

(73) Assignee: Capital One Services, LLC, McLean, VA (US)

( * ) Notice: Subject to any disclaimer, the term of this patent is extended or adjusted under 35 U.S.C. 154(b) by 490 days.

(21) Appl. No.: 18/341,730

(22) Filed: Jun. 26, 2023

(65) Prior Publication Data

US 2024/0428132 A1     Dec. 26, 2024

(51) Int. Cl.
G06N 20/00          (2019.01)
(52) U.S. Cl.
CPC .................................... G06N 20/00 (2019.01)
(58) Field of Classification Search
CPC ..................................................... G06N 20/00
See application file for complete search history.

(56) References Cited

U.S. PATENT DOCUMENTS

| | | | | |
|---|---|---|---|---|
| 9,990,587 | B2 * | 6/2018 | Okanohara | G06N 20/00 |
| 11,620,583 | B2 * | 4/2023 | Wang | G06N 3/08 |
| | | | | 706/12 |
| 2023/0052231 | A1 * | 2/2023 | Marathe | G06F 21/6245 |
| 2024/0054391 | A1 * | 2/2024 | Guha Thakurta | G06N 3/063 |
| 2024/0193308 | A1 * | 6/2024 | Goodsitt | G06N 3/098 |
| 2024/0193487 | A1 * | 6/2024 | Farnan | G06N 3/08 |

* cited by examiner

*Primary Examiner* — Beemnet W Dada
(74) *Attorney, Agent, or Firm* — Foley & Lardner LLP

(57) ABSTRACT

Methods and systems for generating federated learning models. In some aspects, the system receives, from each client device, user data profiles that are anonymized with respect to users associated with user data stored locally at a client device. The system processes the user data profiles to generate a plurality of clusters. For each cluster, the system transmits, to one or more client devices corresponding to a cluster, a first instruction to train a machine learning model on user data corresponding to user data profiles included in the cluster and a second instruction to validate the machine learning model with respect to user data corresponding to one or more clusters of the plurality of clusters other than the cluster to generate a prediction accuracy metric. The system determines, from the plurality of clusters, a first cluster based on associated prediction accuracy metrics.

19 Claims, 6 Drawing Sheets

400

Receive user data profiles wherein the user data profiles are anonymized with respect to users associated with respect to users associated with the user data stored locally at the client device
402

Process the user data profiles to generate a plurality of clusters
404

Transmit a first instruction to train a machine learning model on user data corresponding to user data profiles included in the cluser
406

Transmit a second instruction to validate the machine learning model with respect to user data corresponding to one or more clusters of the plurality of clusters to generate a predication accuracy metric
408

Determine a first cluster having a highest value for the combined prediction accuracy metric
410

Process using the first machine learning model, input data to produce corresponding output data
412

100

230

250

400

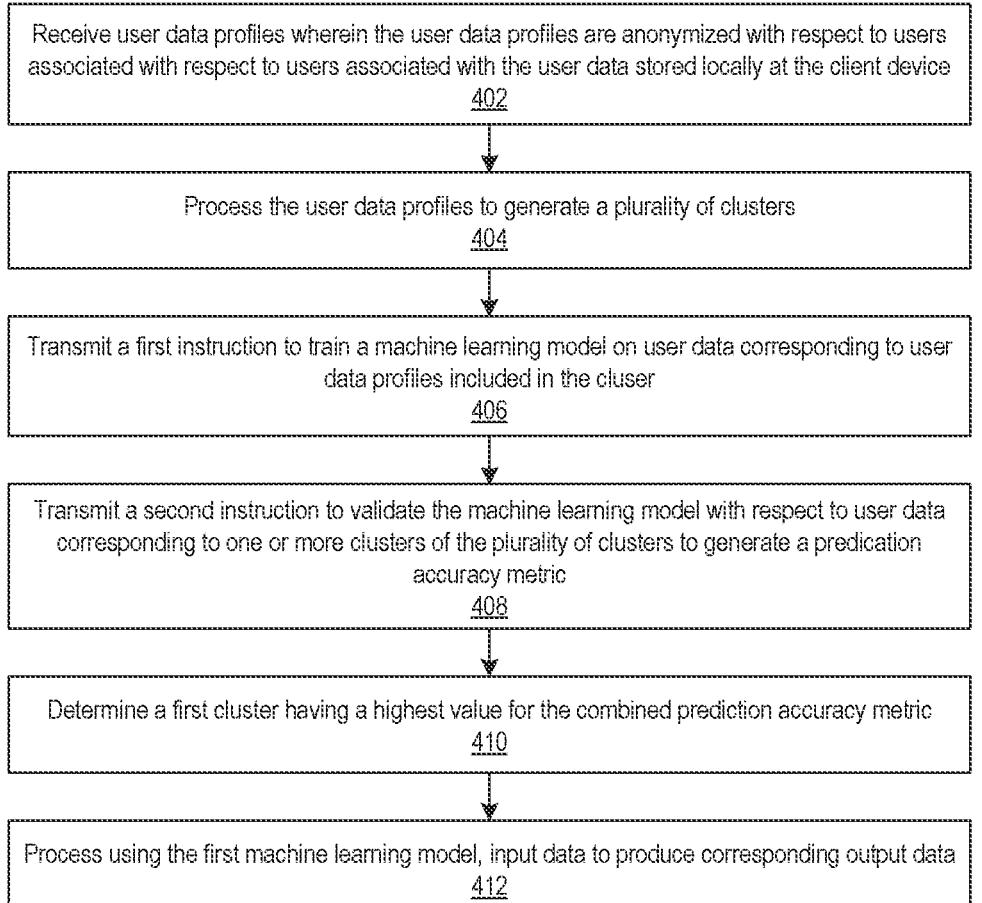

Receive user data profiles wherein the user data profiles are anonymized with respect to users associated with respect to users associated with the user data stored locally at the client device
402

Process the user data profiles to generate a plurality of clusters
404

Transmit a first instruction to train a machine learning model on user data corresponding to user data profiles included in the cluser
406

Transmit a second instruction to validate the machine learning model with respect to user data corresponding to one or more clusters of the plurality of clusters to generate a predication accuracy metric
408

Determine a first cluster having a highest value for the combined prediction accuracy metric
410

Process using the first machine learning model, input data to produce corresponding output data
412

*FIG. 4*

SYSTEMS AND METHODS FOR GENERATING FEDERATED LEARNING MODELS

SUMMARY

In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. Federated machine learning is a machine learning technique in which the algorithm trains across multiple decentralized edge devices with local data samples without sending training data back to a central training server. This allows client devices to train a shared machine learning model while keeping all the training data local. Each client device downloads the shared machine learning model and retrains or updates the model using local training data. Each device then sends an updated set of model weights to the cloud (e.g., a central system), wherein it is merged with other client device updates to improve the shared model. However, federated machine learning is not without challenges. In particular, current federated learning systems fail to accurately account for skewed user data at a client device into training data for the federated learning system and subsequently do not provide a model that is representative of user data across all client devices.

Accordingly, methods and systems are described herein for novel uses and/or improvements to federated machine learning techniques and in particular to generating a federated learning machine learning model. Current training methods do not account for skewed user data at a local device with respect to the representative population of user data across client devices. Thus, existing systems allow for processes that lead to training machine learning models on skewed client data from one or more local devices, thereby causing the system to generate machine learning models that lack accuracy and precision. To overcome these technical deficiencies in adapting federated learning for the practical benefit of ensuring skewed user data at a client device does not impact the machine learning model generated at a centralized device, methods and systems disclosed herein utilize novel user data profiles that are generated from user data at a local device. The user data profiles are anonymized with respect to users associated with the user data stored locally at the client device. The centralized device may use the user data profiles to generate a plurality of clusters. Each cluster may include a subset of the user data profiles across one or more client devices. The centralized device may request training and validation of machine learning models at local devices based on user data belonging to a particular cluster. The system may determine a particular cluster having a highest value for prediction accuracy on user data from other clusters present at the local devices and generate a combined machine learning model corresponding to the particular cluster. By generating federated learning models based on user data profiles executed locally at client devices, the system will result in models that have more accurate results and are representative of the whole population of user data across client devices.

In some aspects, the problems described above may be solved using a system that may perform the following operations. The system may receive user data profiles corresponding to a client device. In particular, the system may receive from each client device of a plurality of client devices, user data profiles that are anonymized with respect to users associated with user data stored locally at a client device. For example, the client device may process the client data stored locally on the device with a data profiling function. The data profiling function may remove any dataset attribute values or identifiers that are associated with users. Thus, the centralized device may receive a dataset that may contain anonymized user data from the client device.

The system may generate a plurality of clusters based on the user data profiles. In particular, the system may process, using a clustering function, the user data profiles to generate a plurality of clusters. For example, the system may process the plurality of user data profiles to determine how many clusters to generate in such a manner that each cluster is representative of a subset of user data population across client devices. For example, the system may determine there is a particular number of user data profiles with dataset values that are uncommon in the remaining user data profiles. Thus, the system may determine to generate that particular number of clusters.

The system may request training a machine learning model at client devices corresponding to each cluster. In particular, the system may for each cluster, transmit to one or more client devices corresponding to a cluster, a first instruction to train a machine learning model on user data corresponding to user data profiles included in the cluster. For example, each client device may host a machine learning model. Some examples of machine learning models may include spam detection models, prediction models, etc. Although each machine learning model may perform the same function, the machine learning models may be trained using data on each client device. Each client device may have a machine learning model tuned to the data on that client device. In each cluster, client devices may aggregate all the sets of machine weights together. The combination of weights may be performed using a particular function or algorithm (e.g., weighted average based on the amount of data processed by each client device). Thus, each cluster may train a machine learning model using the plurality of client devices and user data profiles. In some embodiments, the system may determine hyperparameters for each machine learning model at each client device based on the number of clusters. For example, if there are three clusters, the system may test three different hyperparameters simultaneously. For example, the system may specify the range of values for each hyperparameter to tune and run an optimization algorithm to determine which set of hyperparameters (e.g., a set of hyperparameters for a neural network such as learning rate, number of layers, and a number of neurons) has the highest performance.

The system may request validation of the machine learning model at each client device with respect to user data corresponding to clusters other than the cluster used to train the machine learning model. In particular, the system may for each cluster, transmit to the one or more client devices corresponding to the cluster, a second instruction to validate the machine learning model with respect to user data corresponding to one or more clusters of the plurality of clusters other than the cluster to generate a prediction accuracy metric. For example, the system may transmit an instruction that each client device corresponding to a cluster to validate a spam detection system using user data corresponding to clusters other than the cluster used to train the machine learning model. The system may receive a prediction accuracy metric after the validation is complete. For example, each prediction accuracy metric may be generated locally on each client device and then aggregated for the cluster and may indicate how well the machine learning model is performing. The prediction accuracy metric may include classification accuracy, confusion matrix accuracy, or F1 score. Thus, the system may validate the machine learning model across the client devices corresponding to each cluster.

The system may determine which cluster is associated with the highest prediction accuracy metric. In particular, the system may determine, from the plurality of clusters, a first cluster based on associated prediction accuracy metrics. For example, the system may generate five machine learning models corresponding to five clusters. When validating the models, the system may receive at most four prediction accuracy metrics for each model. The system may average the prediction accuracy metric for each model. Thus, the system may determine which cluster is associated with the highest prediction accuracy metric.

In some embodiments, the system may generate a first machine learning model. In particular, the system may generate a first machine learning model corresponding to the first cluster based on machine learning models obtained from each client device of the one or more client devices corresponding to the first cluster. For example, the system may receive, from the one or more client devices, a plurality of sets of model weights. Each client device may transmit a set of model weights. In response to receiving the plurality of sets of model weights, the system may aggregate the plurality of sets of model weights into an aggregated set of model weights. The system may generate the first machine learning model corresponding to the first cluster using the aggregated set of model weights.

The system may process input data using the first machine learning model. In particular, the system may process, using a first machine learning model corresponding to the first cluster, input data to produce corresponding output data. For example, the system may receive from the plurality of client devices in the first cluster the model weights. In response, the centralized device may generate the first machine learning model. The first machine learning model may process input data from a device to produce corresponding output data from the device.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 4 illustrates generating a federated learning model based on user data profiles executed locally at client devices, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
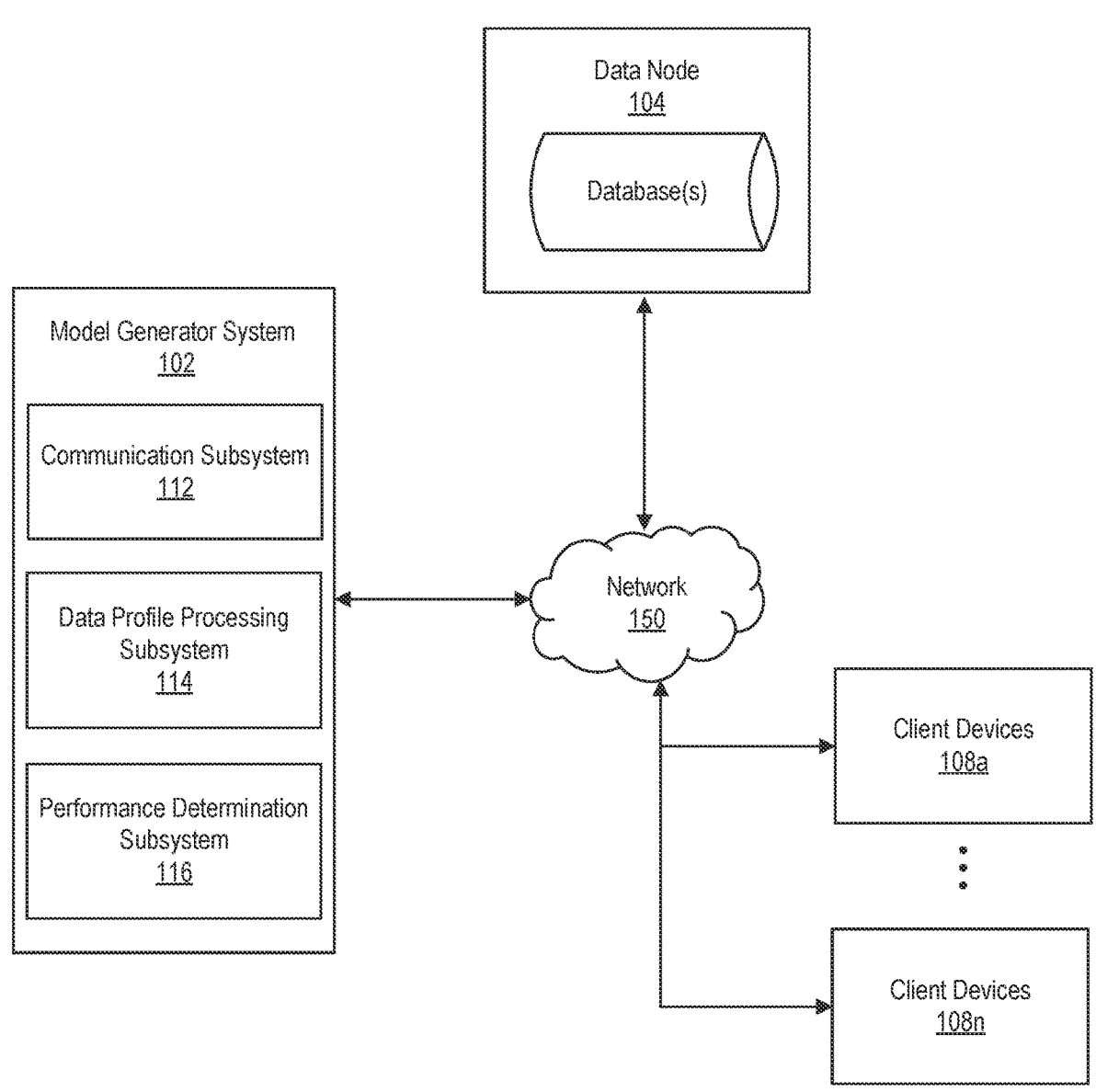
FIG. 1 shows an illustrative diagram for generating a federated learning model based on user data profiles executed locally at client devices, in accordance with one or more embodiments.

FIG. 1 shows an illustrative environment for generating a federated learning machine learning model based on user data profiles executed locally at client devices, in accordance with one or more embodiments of this disclosure. Environment 100 includes model generator system 102, data node 104, and client devices 108a-108n. Model generator system 102 may include software, hardware, or a combination of both and may reside on a physical server or a virtual server running on a physical computer system (e.g., centralized device 202 described with respect to FIG. 2A). In some embodiments, model generator system 102 may be configured on a user device (e.g., a laptop computer, a smart phone, a desktop computer, an electronic tablet, or another suitable user device). Furthermore, model generator system 102 may reside on a cloud-based system and/or interface with computer models either directly or indirectly, for example, through network 150. Model generator system 102 may include communication subsystem 112, data profile processing subsystem 114, and/or performance determination subsystem 116.

Data node 104 may store various data, including one or more machine learning models, training data, user data profiles, input data, output data, performance data, and/or other suitable data. Data node 104 may include software, hardware, or a combination of the two. In some embodiments, model generator system 102 and data node 104 may reside on the same hardware and/or the same virtual server or computing device. Network 150 may be a local area network, a wide area network (e.g., the Internet), or a combination of the two.

Client devices 108a-108n may include software, hardware, or a combination of the two. For example, each client device may include software executed on the device or may include hardware such as a physical device. Client devices may include user devices (e.g., a laptop computer, a smart-phone, a desktop computer, an electronic tablet, or another suitable user device).

Model generator system 102 may receive user data profiles from one or more client devices. Model generator system 102 may receive data using communication subsystem 112, which may include software components, hardware components, or a combination of both. For example, communication subsystem 112 may include a network card (e.g., a wireless network card and/or a wired network card) that is associated with software to drive the card and enables communication with network 150. In some embodiments, communication subsystem 112 may also receive data from and/or communicate with data node 104 or another computing device. Communication subsystem 112 may receive data, such as input data, input data profiles, or information about profile domains (e.g., sets of criteria). Communication subsystem 112 may communicate with data profile processing subsystem 114 and performance determination subsystem 116.

Model generator system 102 may include data profile processing subsystem 114. Communication subsystem 112 may pass at least a portion of the data or a pointer to the data in memory to data profile processing subsystem 114. Data profile processing subsystem 114 may include software components, hardware components, or a combination of both. For example, data profile processing subsystem 114 may include software components or may include one or more hardware components (e.g., processors) that are able to execute operations for clustering client devices 108a-108n based on data profiles. Data profile processing subsystem 114 may access data, such as user data profiles. Data profile processing subsystem 114 may directly access data or nodes associated with client devices 108a-108n and may transmit data to these client devices. Data profile processing subsystem 114 may, additionally or alternatively, receive data from and/or send data to communication subsystem 112 and performance determination subsystem 116.

Performance determination subsystem 116 may execute tasks relating to determining the performance of machine learning models stored on client devices 108a-108n. Performance determination subsystem 116 may include software components, hardware components, or a combination of both. For example, in some embodiments, performance determination subsystem 116 may receive data output from a machine learning model (e.g., from machine learning models stored on client devices 108a-108n). Performance determination subsystem 116 may utilize one or more accuracy metrics in order to determine the performance of a given machine learning model with respect to the validation of the machine learning model. Performance determination subsystem 116 may, for example, utilize accuracy metrics such as classification accuracy, confusion matrix accuracy, or F1 scores. Performance determination subsystem 116 may receive input data, as well as data output by client devices 108a-108n. Performance determination subsystem 116 may allow model generator system 102 allows the system to improve model generation, in accordance with one or more embodiments. Performance determination subsystem 116 may, additionally or alternatively, receive data from and/or send data to communication subsystem 112, or data profile processing subsystem 114.

Figure 2A:
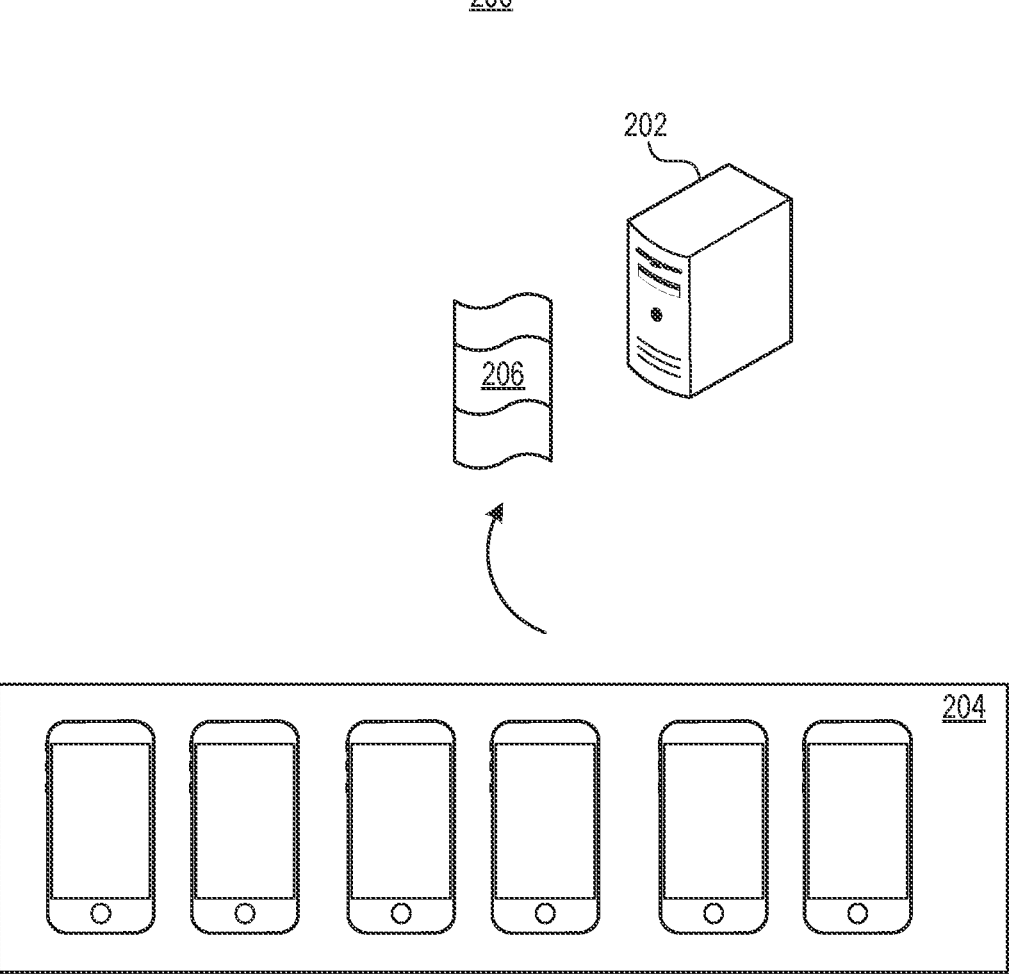
FIG. 2A-FIG. 2C show illustrative diagrams for processing clusters based on user data profiles in a federated learning environment, in accordance with one or more embodiments.
Figure 2B:
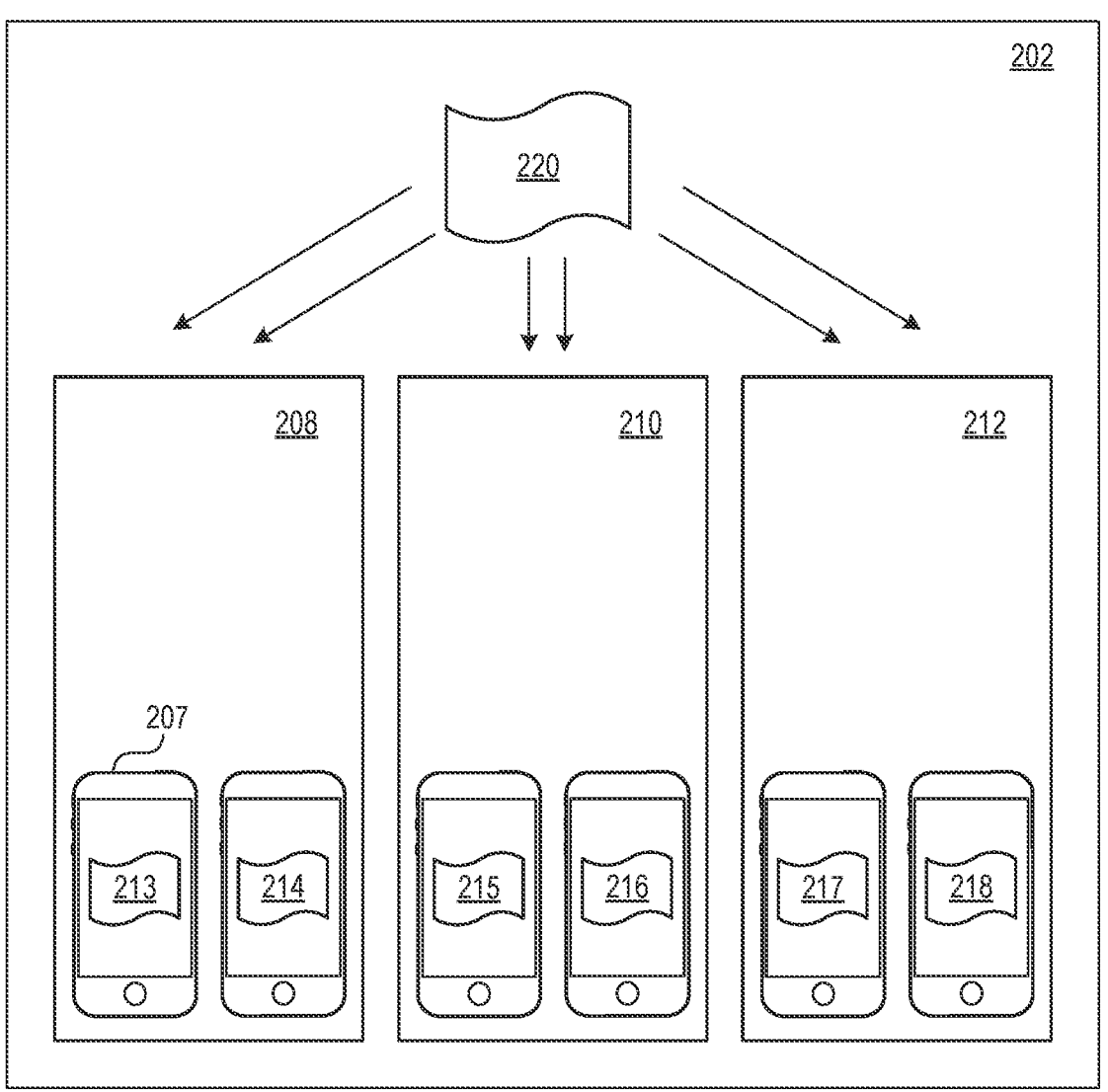
Figure 2C:
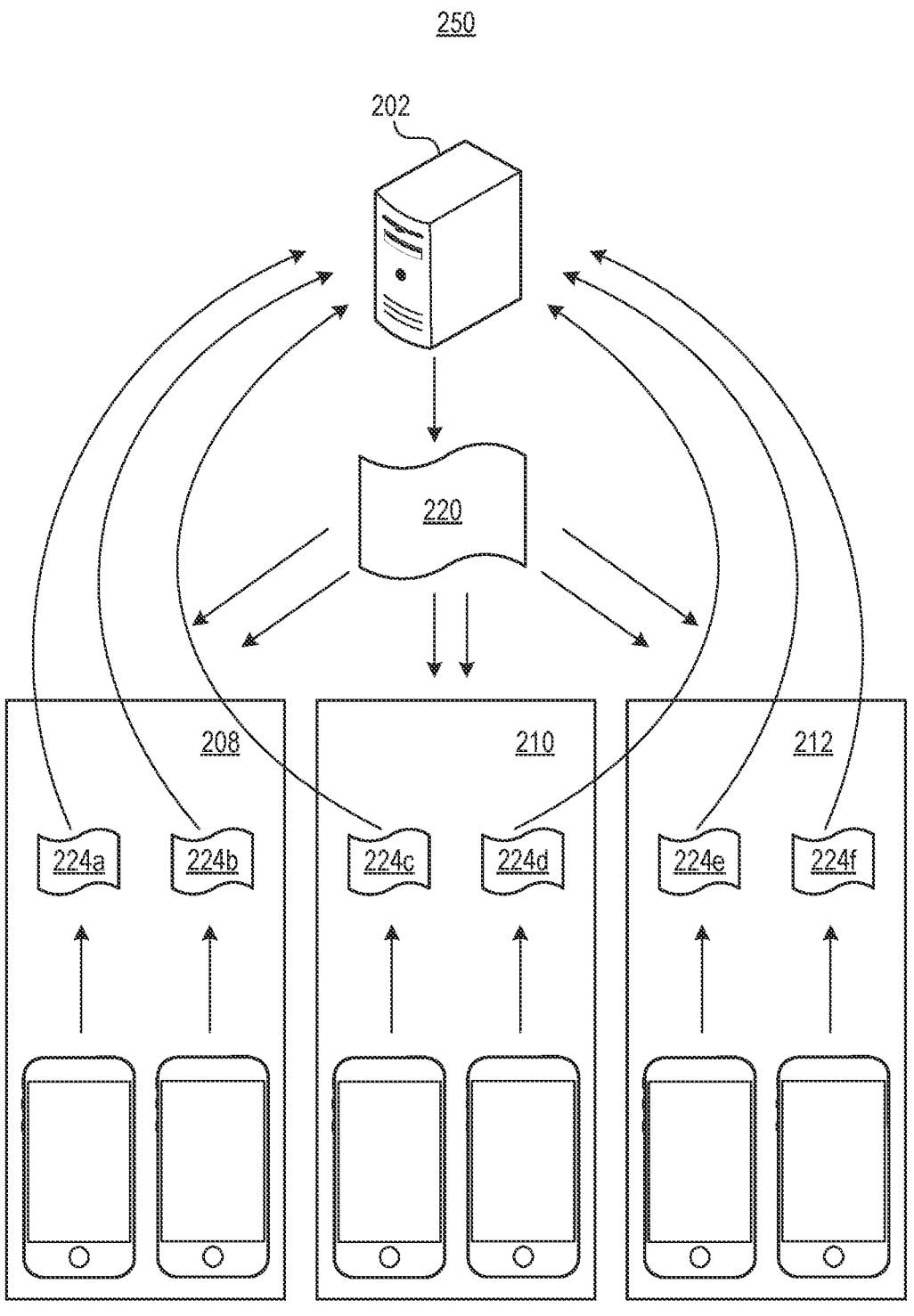

FIG. 2A-FIG. 2C show illustrative diagrams for processing clusters based on user data profiles in a federated learning environment, in accordance with one or more embodiments. FIG. 2A shows environment 200. Environment 200 includes centralized device 202, user data profiles 206, and a plurality of client devices 204.

Centralized device 202 may receive from each client device of a plurality of client devices (e.g., the plurality of client devices 204) user data profiles 206 that are anonymized with respect to users associated with user data stored locally at a client device. In some embodiments, a client device may process the user data stored locally on the client device using a data profiling function. In particular, the client device (e.g., a client device in the plurality of client devices 204) may be configured to process, using a data profiling function, user data stored locally at the client device to generate corresponding user data profiles. The user data profiles are anonymized with respect to users associated with the user data. For example, the data profiling function may remove any dataset attribute values or identifiers that are associated with users or may be used to identify corresponding users. The client device may transmit, to centralized device 202, user data profiles 206. Thus, the centralized device 202 may receive a dataset that may contain anonymized user data in the form of user data profiles from the client device.

In some embodiments, a user data profile may include an anonymized user dataset stored on the client device. For example, the data profiling function may remove any dataset attribute values or identifiers that are associated with users. In some embodiments, a user data profile may include a set of metadata or anonymized attributes related to the user dataset stored on the client device. For example, a user data profile may include information about the shape or size of data such as the number of columns or rows within the user dataset. Other attributes within a user data profile may include other analytical information, such as minimum or maximum values, or standard deviations (i.e., statistical information), which may be helpful for determining clusters. Additionally, the user data profile may include data such as categories within the data or the timeframe of the data. For example, the centralized device 202 may determine to generate clusters based on any of the attributes within the user data profile. Therefore, the centralized device 202 is able to ensure that each cluster of client devices is representative of the whole population of user data across client devices. By receiving anonymized analytical information relating to the user dataset in the form of a user data profile, centralized device 202 may improve the efficiency of the federated learning models generated on the user data profiles while protecting the privacy of the user.

FIG. 2B shows environment 230. Environment 230 includes centralized device 202, client device 207, cluster 208, cluster 210, cluster 212, user data profiles 213-218 and instruction 220. Centralized device 202 may generate a plurality of clusters based on the user data profiles via data profile processing subsystem 114. In particular, the centralized device 202 may process, using a clustering function, the user data profiles 206 to generate a plurality of clusters (e.g., clusters 208-clusters 212). For example, the system may process the plurality of user data profiles 206 to determine how many clusters to generate in such a manner that each cluster is representative of a subset of user data population across client devices (e.g., the plurality of client devices 204). For example, the centralized device 202 may determine there is a particular number of user data profiles with dataset values that are uncommon in the remaining user data profiles. In some embodiments, each cluster in the plurality of clusters comprises a subset of the user data profiles across one or more client devices. For example, each client device in clusters 208-clusters 212 corresponds to a user data profile from user data profiles 213-user data profiles 218. Thus, the centralized device 202 may determine to generate that particular number of clusters.

The centralized device 202 may request training a machine learning model at client devices corresponding to each cluster. In particular, the centralized device 202 may for each cluster (e.g., cluster 208-cluster 212), transmit to one or more client devices corresponding to a cluster (e.g., client device 207 in cluster 208), a first instruction (e.g., instruction 220) to train a machine learning model on user data corresponding to user data profiles included in the cluster (e.g., user data profiles 213-214 in cluster 208). For example, each client device (e.g., client device 207) may host a machine learning model. Some examples of machine learning models may include spam detection models, prediction models, etc. Although each machine learning model may perform the same function, the machine learning models may be trained using data on each client device. Each client device (e.g., client device 207) may have a machine learning model tuned to the data on that client device (e.g., client device 207). In each cluster, centralized device 202 may aggregate all the sets of model weights together. The combination of model weights may be performed using a particular function or algorithm (e.g., weighted average based on the amount of data processed by each client device). Thus, each cluster (e.g., clusters 208-212) may train a machine learning model using the plurality of client devices (e.g., the plurality of client devices 204) and user data profiles (e.g., user data profiles 213-218). In some embodiments, the system may determine a different set of hyperparameters for each cluster. For example, each cluster may include a set of hyperparameters with a different learning rate compared to the other clusters.

In some embodiments, the client device may add random noise to the user data on the client device prior to training the machine learning model. In particular, the client device may process the user data to determine an amount of random noise required. The client device may generate the random noise or receive the random noise from an external source. The random noise may include additional data. The client device may add the random noise to the user data on the client device (e.g., client device 207) prior to training the machine learning model. By adding random noise to the user data on the client device, the client device is able to ensure that despite the nature of the user data on the client device no algorithm is able to decipher the user that the user data is associated with. Thus, the client device may ensure that the user data is anonymized before training the machine learning model on the client device.

FIG. 2C shows environment 250. Environment 250 includes centralized device 202, cluster 208, cluster 210, cluster 212, instruction 222, and prediction accuracy metrics 224a-224f. The centralized device 202 may request validation of the machine learning model at each client device with respect to user data corresponding to clusters other than the cluster used to train the machine learning model. In particular, the centralized device 202 may for each cluster (e.g., clusters 208-212), transmit to the one or more client devices corresponding to the cluster (e.g., client device 207 in cluster 208), a second instruction (e.g., instruction 222) to validate the machine learning model with respect to user data corresponding to one or more clusters of the plurality of clusters other than the cluster to generate a prediction accuracy metric (e.g., prediction accuracy metrics 224a-224f). For example, the centralized device 202 may transmit an instruction (e.g., instruction 222) that each client device corresponding to a cluster validates a spam detection system using user data corresponding to clusters other than the cluster used to train the machine learning model. The centralized device 202 may receive a prediction accuracy metric (prediction accuracy metric 224a from client device 207) after the validation is complete. Thus, the centralized device 202 may validate the machine learning model across the client devices corresponding to each cluster.

In some embodiments, the centralized device 202 may determine a combined prediction accuracy metric. In particular, the centralized device 202 may determine a combined prediction accuracy metric for each cluster based on prediction accuracy metrics from each client device of the one or more client devices corresponding to the cluster. For example, each prediction accuracy metric may be generated locally on each client device and then aggregated for the cluster and may indicate how well the machine learning model is performing. For example, for cluster 208, prediction accuracy metrics 224a and 224b may aggregate together to determine a combined prediction accuracy metric for the machine learning model corresponding to cluster 208. Thus, the centralized device 202 may measure the performance of the machine learning model in each cluster.

In some embodiments, a "prediction accuracy metric" may include any quantitative measure of model performance. In some embodiments, a prediction accuracy metric may include error values. For example, a prediction accuracy metric may include confusion matrices, type I or II errors, accuracy, recall/true positive rate or sensitivity, precision, specificity, F1 scores, Receiver Operating Characteristics Curve Area Under the Curve scores (ROC Curve-AUC score), or Prediction-Recall curves. In some embodiments, a prediction accuracy metric may include a mean absolute error, mean squared error, root mean squared error or R-squared errors as statistical metrics. Prediction accuracy metrics may be comparable across clusters. By calculating a prediction accuracy metric, performance determination subsystem 116 may present a universal, objective metric of model performance and compare this metric between each cluster to determine which machine learning model has the highest performance. Thus, centralized device 202 may generate a more efficient and accurate federated learning model.

The centralized device 202 may determine which cluster is associated with the highest prediction accuracy metric. In particular, the centralized device 202 may determine, from the plurality of clusters, a first cluster based on associated prediction accuracy metrics. For example, the centralized device 202 may generate three machine learning models corresponding to clusters 208-212. When validating the models, the centralized device 202 may receive at most two combined prediction accuracy metrics for each model. For example, the machine learning model for cluster 208 may receive a first combined prediction accuracy metric from cluster 210 and a second combined prediction accuracy metric from cluster 212. The centralized device 202 may average the prediction accuracy metric for each model and compare the averaged accuracy metric for each model. Thus, the centralized device 202 may determine which cluster is associated with the highest prediction accuracy metric.

In some embodiments, the centralized device 202 may generate a first machine learning model. In particular, the centralized device 202 may generate a first machine learning model corresponding to the first cluster based on machine learning models obtained from each client device of the one or more client devices corresponding to the first cluster. For example, the centralized device 202 may receive, from the one or more client devices (e.g., the plurality of client devices 204), a plurality of sets of model weights. Each client device (e.g., client device 207) may transmit a set of model weights. In response to receiving the plurality of sets of model weights, the centralized device 202 may aggregate the plurality of sets of model weights into an aggregated set of model weights. The centralized device 202 may generate the first machine learning model corresponding to the first cluster using the aggregated set of model weights.

The centralized device 202 may process input data using the first machine learning model. In particular, the centralized device 202 may process, using a first machine learning model corresponding to the first cluster, input data to produce corresponding output data. For example, the centralized device 202 may receive from the plurality of client devices the sets of model weights for the first cluster. In response, centralized device 202 may generate the first machine learning model based on the sets of model weights. The first machine learning model may process input data from a device to produce corresponding output data from the device.

In some embodiments, the centralized device 202 may generate an updated machine learning model. In particular, the centralized device 202 may determine, for each cluster in the plurality of clusters, a threshold for a prediction accuracy metric. The centralized device 202 may determine, for each cluster in the plurality of clusters, whether a corresponding prediction accuracy metric is lower than the threshold. In response to detecting the corresponding prediction accuracy metric of the machine learning model is lower than the threshold, the centralized device 202 may receive from the plurality of client devices (e.g., the plurality of client devices 204), new user data profiles corresponding to each client device. The centralized device 202 may process, using the clustering function, the new user data profiles to generate a new plurality of clusters. The centralized device 202 may generate an updated first machine learning model, wherein the updated first machine learning model corresponds to a new cluster with a highest value for the combined prediction accuracy metric. Thus, the centralized device 202 may ensure the machine learning model is optimized for the plurality of client devices.

In some embodiments, a threshold may include a threshold prediction accuracy metric, which enables the performance determination subsystem 116 to determine the performance quality of the machine learning models for each cluster. Therefore, the centralized device 202 may make an efficient decision to process another round of user data profiles and generate new clusters.

Figure 3:
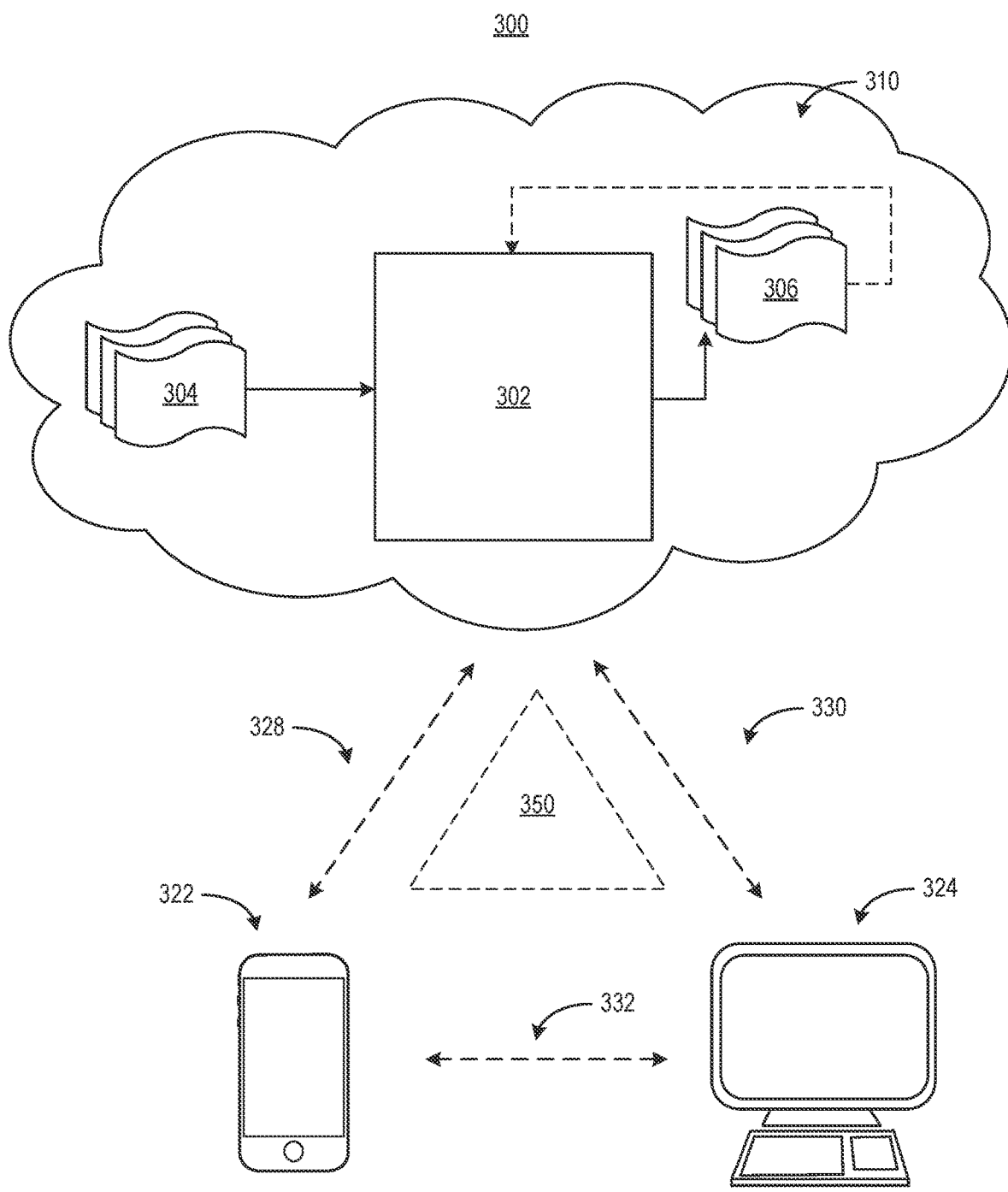
FIG. 3 illustrates components for a system used alongside machine learning models, in accordance with one or more embodiments.

FIG. 3 shows illustrative components for a system used to generate federated learning models based on user data profiles executed locally at client devices, in accordance with one or more embodiments. For example, FIG. 3 may show illustrative components for ensuring skewed user data at a client device does not impact the machine learning model generated at a centralized device for the federated learning system. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device

322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model generator system 102, communication subsystem 112, data profile processing subsystem 114, performance determination subsystem 116, data node 104, or client devices 108a-108n, and may be connected to network 150. Cloud components 310 may access user data profiles (e.g., user data profiles 206) and the machine learning models stored on each client device.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., detecting spam emails).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302.

In some embodiments, the model (e.g., model 302) may automatically perform actions based on outputs 306. In some embodiments, the model (e.g., model 302) may not perform any actions. The output of the model (e.g., model 302) may be used to predict outcomes, perform classification, or for any other function for which a machine learning model may be used.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

FIG. 4 shows a flowchart of the steps involved in generating a federated learning model based on user data profiles executed locally at client devices, in accordance with one or more embodiments. For example, the system may use process 400 (e.g., as implemented on one or more system components described above) in order to ensure skewed user data at a client device does not impact the machine learning model generated at a centralized device.

At operation 402, process 400 (e.g., using one or more components described above) may receive user data profiles wherein the user data profiles are anonymized with respect to users associated with respect to users associated with the user data stored locally at the client device. For example, the system may receive, from each client device of a plurality of client devices, user data profiles that are anonymized with respect to users associated with user data stored locally at a client device. For example, the communication subsystem 112, which may reside on cloud components 310, may receive an anonymized user dataset (e.g., user data profiles 206) that indicates whether the user is receiving spam emails for a machine learning model that detects spam emails. By doing so, the system may generate clusters based on user data profiles it has received.

In some embodiments, the system may process the client data stored locally on the device with a data profiling function. For example, the system may include a client device configured to process, using a data profiling function, user data stored locally at the client device to generate corresponding user data profiles. The user data profiles may be anonymized with respect to users associated with the user data. The system may transmit, to a centralized device, the user data profiles. For example, client device 207 may process user data locally at client device 207 to generate a corresponding user data profile 213. By doing so, the system may protect the user's privacy.

At operation 404, process 400 (e.g., using one or more components described above) may process the user data profiles to generate a plurality of clusters. For example, the system may process, using a clustering function, the user data profiles to generate a plurality of clusters. For example, the data profile processing subsystem 114, which may reside on cloud components 310, may generate three clusters (e.g., cluster 208, cluster 210, and cluster 212) for the spam email detection model. In one example, each cluster may have an equal distribution of users and client devices who receive a large quantity of spam and users who don't. By doing so, the system may subdivide client devices into clusters where each cluster is representative of the whole population.

At operation 406, process 400 (e.g., using one or more components described above) may transmit a first instruction to train a machine learning model on user data corresponding to user data profiles included in the cluster. For example, the system may transmit, to one or more client devices corresponding to a cluster, a first instruction to train a machine learning model on user data corresponding to user data profiles included in the cluster. For example, the communication subsystem 112 may request the user devices to train the spam detection model (e.g., model 302) on each device in each cluster through instruction 220 using communication paths 328, 330, and 332. By doing so, the system may train multiple machine learning models simultaneously.

In some embodiments, the system may add random noise to the user data on the client device prior to training the machine learning model. For example, the system may process the user data to determine an amount of random noise required. The system may generate the random noise. The random noise may include additional data. The system may add the random noise to the user data on the client device (e.g., client device 207) prior to training the machine learning model (e.g., model 302). By adding random noise to the user data on client device 207, the system is able to ensure that despite the nature of the user data on the client device no algorithm is able to decipher the user that the user data is associated with. By doing so, the system may ensure that the user data is anonymized before training the machine learning model on the client device.

At operation 408, process 400 (e.g., using one or more components described above) may transmit a second instruction to validate the machine learning model with respect to user data corresponding to one or more clusters of the plurality of clusters to generate a predication accuracy metric. For example, the system may transmit, to the one or more client devices corresponding to the cluster, a second instruction to validate the machine learning model with respect to user data corresponding to one or more clusters of the plurality of clusters other than the cluster to generate a prediction accuracy metric. For example, the communication subsystem 112 may request each user device (e.g., client device 207 in cluster 208) to validate another cluster's machine learning model (e.g., client devices in cluster 210) and determine the performance of that model through instruction 222 using communication paths 328, 330, and 332. By doing so, the system may determine how well the machine learning model is performing.

In some embodiments, the system may determine a combined prediction accuracy metric. The system may determine a combined prediction accuracy metric for the cluster based on prediction accuracy metrics from each client device of the one or more client devices corresponding to the cluster. For example, each prediction accuracy metric may be generated locally on each client device and then aggregated for the cluster and may indicate how well the machine learning model is performing. For example, performance determination subsystem 116 may aggregate prediction accuracy metrics 224a and 224b for cluster 208 to determine a combined prediction accuracy metric. By doing so, the system may measure the performance of the machine learning model in each cluster.

At operation 410, process 400 (e.g., using one or more components described above) may determine a first cluster having a highest value for the combined prediction accuracy metric. For example, the system may determine, from the plurality of clusters, a first cluster based on associated prediction accuracy metrics. For example, the performance determination subsystem 116 may compare the average predicted accuracy metrics between each model (e.g., model 302) and determine which model is performing the best. By doing so, the system may generate the best performing machine learning model from all the clusters.

In some embodiments, the system may generate a first machine learning model. For example, the system may generate a first machine learning model corresponding to the first cluster based on machine learning models obtained from each client device of the one or more client devices corresponding to the first cluster. For example, the communication subsystem 112 may receive, from the one or more client devices (e.g., client device 207), a plurality of sets of model weights. Each client device (e.g., client device 207)

may transmit a set of model weights. In response to receiving the plurality of sets of model weights, the system may aggregate the plurality of sets of model weights into an aggregated set of model weights. By doing so, the system may generate an optimized first machine learning model corresponding to the first cluster using the aggregated set of model weights.

At operation 412, process 400 (e.g., using one or more components described above) may process using the first machine learning model, input data to produce corresponding output data. For example, the system may process, using a first machine learning model corresponding to the first cluster, input data to produce corresponding output data. For example, the model generator system 102 may process datasets (e.g., input 304) and predict whether a user is receiving spam emails (e.g., output 306). By doing so, the system may generate an accurate federated learning model based on user data profiles.

In some embodiments, the system may generate an updated machine learning model. For example, the system may determine, for each cluster in the plurality of clusters, a threshold for a prediction accuracy metric. The system may determine, for each cluster in the plurality of clusters, whether a corresponding prediction accuracy metric is lower than the threshold. In response to detecting the corresponding prediction accuracy metric of the machine learning model is lower than the threshold, the system may receive from the plurality of client devices, new user data profiles corresponding to each client device. The system may process, using the clustering function, the new user data profiles to generate a new plurality of clusters. The system may generate an updated first machine learning model, wherein the updated first machine learning model corresponds to a new cluster with a highest value for the combined prediction accuracy metric. By doing so, the system may ensure the machine learning model is optimized for the plurality of client devices.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating federated learning models based on user data profiles, the method comprising: receiving, from each client device of a plurality of client devices, user data profiles corresponding to a client device, wherein the user data profiles are generated based on user data stored locally at the client device, wherein the user data profiles are anonymized with respect to users associated with the user data stored locally at the client device; processing, using a clustering function, the user data profiles to generate a plurality of clusters, each cluster comprising a subset of the user data profiles across one or more client devices; for each cluster of the plurality of clusters: transmitting, to the one or more client devices corresponding to a cluster, a first instruction to train a machine learning model on user data corresponding to user data profiles included in the cluster; transmitting, to the one or more client devices corresponding to the cluster, a second instruction to validate the machine learning model with respect to user data corresponding to one or more clusters of the plurality of clusters other than the cluster to generate a prediction accuracy metric; and determining a combined prediction accuracy metric for the cluster based on prediction accuracy metrics from each client device of the one or more client devices corresponding to the cluster; determining, from the plurality of clusters, a first cluster having a highest value for the combined prediction accuracy metric; generating a first machine learning model corresponding to the first cluster based on machine learning models obtained from each client device of the one or more client devices corresponding to the first cluster; and processing, using the first machine learning model, input data to produce corresponding output data.

2. A method for generating federated learning models based on user data profiles, the method comprising: receiving, from each client device of a plurality of client devices, user data profiles that are anonymized with respect to users associated with user data stored locally at a client device; processing, using a clustering function, the user data profiles to generate a plurality of clusters; for each cluster of the plurality of clusters: transmitting, to one or more client devices corresponding to a cluster, a first instruction to train a machine learning model on user data corresponding to user data profiles included in the cluster; and transmitting, to the one or more client devices corresponding to the cluster, a second instruction to validate the machine learning model with respect to user data corresponding to one or more clusters of the plurality of clusters other than the cluster to generate a prediction accuracy metric; determining, from the plurality of clusters, a first cluster based on associated prediction accuracy metrics; and generating a first machine learning model corresponding to the first cluster based on machine learning models obtained from each client device of the one or more client devices corresponding to the first cluster.

3. A method, comprising: receiving, from each client device of a plurality of client devices, user data profiles that are anonymized with respect to users associated with user data stored locally at a client device; processing, using a clustering function, the user data profiles to generate a plurality of clusters; for each cluster of the plurality of clusters: transmitting, to one or more client devices corresponding to a cluster, a first instruction to train a machine learning model on user data corresponding to user data profiles included in the cluster; and transmitting, to the one or more client devices corresponding to the cluster, a second instruction to validate the machine learning model with respect to user data corresponding to one or more clusters of the plurality of clusters other than the cluster to generate a prediction accuracy metric; determining, from the plurality of clusters, a first cluster based on associated prediction accuracy metrics; and processing, using a first machine learning model corresponding to the first cluster, input data to produce corresponding output data.

4. The method of any one of the preceding embodiments, determining a combined prediction accuracy metric for the cluster based on prediction accuracy metrics from each client device of the one or more client devices corresponding to the cluster.

5. The method of any one of the preceding embodiments, further comprising processing, using the first machine learning model, input data to produce corresponding output data.

6. The method of any one of the preceding embodiments, further comprising: determining, for each cluster in the plurality of clusters, a threshold for a prediction accuracy metric; determining, for each cluster in the plurality of clusters, whether a corresponding prediction accuracy metric is lower than the threshold; in response to detecting the corresponding prediction accuracy metric of the machine learning model is lower than the threshold, receiving from the plurality of client devices, new user data profiles corresponding to each client device; processing, using the clustering function, the new user data profiles to generate a new plurality of clusters; and generating an updated first machine learning model, wherein the updated first machine learning model corresponds to a new cluster with a highest value for a combined prediction accuracy metric.

7. The method of any one of the preceding embodiments, wherein each cluster in the plurality of clusters comprises a subset of the user data profiles across one or more client devices.

8. The method of any one of the preceding embodiments, further comprising: processing, at a client device, using a data profiling function, user data stored locally at the client device to generate corresponding user data profiles, wherein the user data profiles are anonymized with respect to users associated with the user data; and transmitting, to a centralized device, the user data profiles.

9. The method of any one of the preceding embodiments, further comprising training at the client device the machine learning model on user data corresponding to user data profiles included in the cluster, comprising: processing the user data to determine an amount of random noise required; generating the random noise, wherein the random noise comprises additional data; and adding the random noise to the user data on the client device prior to training the machine learning model.

10. The method of any one of the preceding embodiments, further comprising: wherein generating a first machine learning model corresponding to the first cluster based on machine learning models obtained from each client device of the one or more client devices corresponding to the first cluster comprises: receiving, from the one or more client devices, a plurality of sets of model weights, wherein each client device transmits a set of model weights;

aggregating the plurality of sets of model weights into an aggregated set of model weights; and generating the first machine learning model corresponding to the first cluster using the aggregated set of model weights.

11. A tangible, non-transitory, machine-readable medium storing instructions that, when executed by a data processing apparatus, cause the data processing apparatus to perform operations comprising those of any of embodiments 1-10.

12. A system comprising one or more processors; and memory storing instructions that, when executed by the processors, cause the processors to effectuate operations comprising those of any of embodiments 1-10.

13. A system comprising means for performing any of embodiments 1-10.

14. A system comprising cloud-based circuitry for performing any of embodiments 1-10.

What is claimed is:

1. A system for generating federated learning models based on user data profiles executed locally at client devices, comprising a centralized device including:

one or more processors; and a non-transitory, computer-readable storage medium storing instructions that, when executed by the one or more processors, cause operations comprising:

receiving, from each client device of a plurality of client devices, user data profiles corresponding to the client device, wherein the user data profiles are generated based on user data stored locally at the client device, wherein the user data profiles are anonymized with respect to users associated with the user data stored locally at the client device;

processing, using a clustering function, the user data profiles to generate a plurality of clusters, each cluster comprising a subset of the user data profiles across one or more client devices;

for each cluster of the plurality of clusters:

transmitting, to the one or more client devices corresponding to a cluster, a first instruction to train a machine learning model on user data corresponding to the user data profiles included in the cluster;

transmitting, to the one or more client devices corresponding to the cluster, a second instruction to validate the machine learning model with respect to user data corresponding to one or more clusters of the plurality of clusters other than the cluster to generate a prediction accuracy metric; and determining a combined prediction accuracy metric for the cluster based on prediction accuracy metrics from each client device of the one or more client devices corresponding to the cluster;

determining, from the plurality of clusters, a first cluster having a highest value for the combined prediction accuracy metric;

generating a first machine learning model corresponding to the first cluster based on machine learning models obtained from each client device of the one or more client devices corresponding to the first cluster; and processing, using the first machine learning model, input data to produce corresponding output data.

2. The system of claim 1, comprising a respective client device configured for:

processing, using a data profiling function, user data stored locally at the respective client device to generate corresponding user data profiles of the user data profiles, wherein the user data profiles are anonymized with respect to users associated with the user data; and transmitting, to the centralized device, the user data profiles.

3. The system of claim 2, wherein the respective client device is further configured to train the machine learning model on the user data corresponding to the user data profiles included in the cluster, comprising:

processing the user data to determine an amount of random noise required;

generating the random noise, wherein the random noise comprises additional data; and adding the random noise to the user data on the respective client device prior to training the machine learning model.

4. The system of claim 1, wherein generating the first machine learning model corresponding to the first cluster based on machine learning models obtained from each client device of the one or more client devices corresponding to the first cluster comprises:

receiving, from the one or more client devices, a plurality of sets of model weights, wherein each client device of the one or more client devices transmits a set of model weights;

aggregating the plurality of sets of model weights into an aggregated set of model weights; and generating the first machine learning model corresponding to the first cluster using the aggregated set of model weights.

5. A method for generating federated learning models based on user data profiles, comprising:

receiving, from each client device of a plurality of client devices, user data profiles that are anonymized with respect to users associated with user data stored locally at a client device;

processing, using a clustering function, the user data profiles to generate a plurality of clusters;

for each cluster of the plurality of clusters:

transmitting, to one or more client devices corresponding to a cluster, a first instruction to train a machine learning model on user data corresponding to the user data profiles included in the cluster; and transmitting, to the one or more client devices corresponding to the cluster, a second instruction to validate the machine learning model with respect to user data corresponding to one or more clusters of the plurality of clusters other than the cluster to generate a prediction accuracy metric;

determining, from the plurality of clusters, a first cluster based on associated prediction accuracy metrics; and generating a first machine learning model corresponding to the first cluster based on machine learning models obtained from each client device of the one or more client devices corresponding to the first cluster.

6. The method of claim 5, further comprising determining a combined prediction accuracy metric for the cluster based on prediction accuracy metrics from each client device of the one or more client devices corresponding to the cluster.

7. The method of claim 5, further comprising processing, using the first machine learning model, input data to produce corresponding output data.

8. The method of claim 5, further comprising:

determining, for each cluster in the plurality of clusters, a threshold for a respective prediction accuracy metric;

determining, for each cluster in the plurality of clusters, whether a corresponding prediction accuracy metric is lower than the threshold;

in response to detecting the corresponding prediction accuracy metric of the machine learning model is lower than the threshold, receiving from the plurality of client devices, new user data profiles corresponding to each client device;

processing, using the clustering function, the new user data profiles to generate a new plurality of clusters; and generating an updated first machine learning model, wherein the updated first machine learning model corresponds to a new cluster with a highest value for a combined prediction accuracy metric.

9. The method of claim 5, wherein each cluster in the plurality of clusters comprises a subset of the user data profiles across the one or more client devices.

10. The method of claim 5, further comprising:

processing, at a respective client device, using a data profiling function, user data stored locally at the respective client device to generate corresponding user data profiles of the user data profiles, wherein the user data profiles are anonymized with respect to users associated with the user data; and transmitting, to a centralized device, the user data profiles.

11. The method of claim 10, further comprising training at the client device the machine learning model on user data corresponding to the user data profiles included in the cluster, comprising:

processing the user data to determine an amount of random noise required;

generating the random noise, wherein the random noise comprises additional data; and adding the random noise to the user data on the client device prior to training the machine learning model.

12. The method of claim 5, wherein generating the first machine learning model corresponding to the first cluster based on machine learning models obtained from each client device of the one or more client devices corresponding to the first cluster comprises:

receiving, from the one or more client devices, a plurality of sets of model weights, wherein each client device of the one or more client devices transmits a set of model weights;

aggregating the plurality of sets of model weights into an aggregated set of model weights; and generating the first machine learning model corresponding to the first cluster using the aggregated set of model weights.

13. A non-transitory, computer-readable storage medium storing instructions that, when executed by one or more processors, cause operations comprising:

receiving, from each client device of a plurality of client devices, user data profiles that are anonymized with respect to users associated with user data stored locally at a client device;

processing, using a clustering function, the user data profiles to generate a plurality of clusters;

for each cluster of the plurality of clusters:

transmitting, to one or more client devices corresponding to a cluster, a first instruction to train a machine learning model on user data corresponding to the user data profiles included in the cluster; and transmitting, to the one or more client devices corresponding to the cluster, a second instruction to validate the machine learning model with respect to user data corresponding to one or more clusters of the plurality of clusters other than the cluster to generate a prediction accuracy metric;

determining, from the plurality of clusters, a first cluster based on associated prediction accuracy metrics; and processing, using a first machine learning model corresponding to the first cluster, input data to produce corresponding output data.

14. The non-transitory, computer-readable storage medium of claim 13, wherein the instructions further cause the one or more processors to perform operations comprising:

processing, at a respective client device, using a data profiling function, user data generated locally at the respective client device to generate corresponding user data profiles of the user data profiles, wherein the user data profiles are anonymized with respect to users associated with the user data; and transmitting, to a centralized device, the user data profiles.

15. The non-transitory, computer-readable storage medium of claim 14, wherein the instructions cause training, at the client device the machine learning model on user data corresponding to the user data profiles included in the cluster, comprising:

processing the user data to determine an amount of random noise required;

generating the random noise, wherein the random noise comprises additional data; and adding the random noise to the user data on the client device prior to training the machine learning model.

16. The non-transitory, computer-readable storage medium of claim 13, wherein generating the first machine learning model corresponding to the first cluster based on machine learning models obtained from each client device of the one or more client devices corresponding to the first cluster further comprises:

receiving, from the one or more client devices, a plurality of sets of model weights, wherein each client device transmits a set of model weights;

aggregating the plurality of sets of model weights into an aggregated set of model weights; and generating the first machine learning model corresponding to the first cluster using the aggregated set of model weights.

17. The non-transitory, computer-readable storage medium of claim 13, wherein the instructions cause the one or more processors to determine a combined prediction accuracy metric for the cluster based on prediction accuracy metrics from each client device of the one or more client devices corresponding to the cluster.

18. The non-transitory, computer-readable storage medium of claim 13, wherein the instructions further cause the one or more processors to perform operations comprising:

determining, for each cluster in the plurality of clusters, a threshold for a respective prediction accuracy metric;

determining, for each cluster in the plurality of clusters, whether a corresponding prediction accuracy metric is lower than the threshold;

in response to detecting the corresponding prediction accuracy metric of the machine learning model is lower than the threshold, receiving from the plurality of client devices, new user data profiles corresponding to each client device;

processing, using the clustering function, the new user data profiles to generate a new plurality of clusters; and generating an updated first machine learning model, wherein the updated first machine learning model corresponds to a new cluster with a highest value for a combined prediction accuracy metric.

19. The non-transitory, computer-readable storage medium of claim 13, wherein the instructions further cause the one or more processors to generate the first machine learning model corresponding to the first cluster based on machine learning models obtained from each client device of the one or more client devices corresponding to the first cluster.

* * * * *